United States Patent [19]

Yoshinaga et al.

[11] Patent Number: 4,832,474
[45] Date of Patent: May 23, 1989

[54] MICROSCOPE APPARATUS FOR EXAMINING WAFER

[75] Inventors: Makoto Yoshinaga; Yoichi Iba; Noriyuki Miyahara; Masami Kawasaki; Terumasa Morita; Takashi Nagano, all of Hachiouji, Japan

[73] Assignee: Olympus Optical Co., Ltd., Tokyo, Japan

[21] Appl. No.: 198,642

[22] Filed: May 26, 1988

Related U.S. Application Data

[63] Continuation of Ser. No. 825,753, Feb. 3, 1986, abandoned.

[30] Foreign Application Priority Data

Feb. 4, 1985 [JP] Japan .................... 60-18771
Feb. 8, 1985 [JP] Japan .................... 60-23072

[51] Int. Cl.⁴ .................... G02B 21/26; G02B 21/32
[52] U.S. Cl. .................... 350/529; 350/521; 350/530; 350/531; 350/532; 350/320
[58] Field of Search ............ 350/415, 453, 507, 518, 350/521, 529, 530, 531, 532, 320

[56] References Cited

U.S. PATENT DOCUMENTS

| | | | |
|---|---|---|---|
| 3,051,026 | 8/1962 | DaCosta | 350/521 |
| 3,508,835 | 4/1970 | Ware | 350/521 |
| 3,641,648 | 2/1972 | Kalberman | 350/532 |
| 4,217,977 | 0/1980 | Tam | 198/341 |
| 4,457,419 | 0/1984 | Ogami et al. | 198/345 |
| 4,582,191 | 4/1986 | Weigand | 350/532 |

FOREIGN PATENT DOCUMENTS 0054127 6/1982 European Pat. Off. ............ 350/518
3127990 of 1982 Fed. Rep. of Germany .

OTHER PUBLICATIONS

W. J. Alford et al., "Laser Scanning Microscopy", Proceedings of the IEEE, Vol. 70, No. 6, Jun. 1982, pp. 641–651.

Primary Examiner—Bruce Y. Arnold
Assistant Examiner—Ronald M. Kachmarik
Attorney, Agent, or Firm—Cushman, Darby & Cushman

[57] ABSTRACT

In order to substantially reduce the time required for examination and to enable the structure of the microscope apparatus for examining a wafer to be made in a compact size, the apparatus comprises a wafer examination unit provided midway on the transportation course of the wafer transporting means for being able to move the wafer under examination independently of the direction of its transporation, and an objective disposed above the wafer examination unit for being able to move along the upper face of the wafer which is held at the position of examination and in a direction different from the direction of the transportation.

12 Claims, 6 Drawing Sheets

MICROSCOPE APPARATUS FOR EXAMINING WAFER

This is a continuation of application Ser. No. 825,753, filed Feb. 3, 1986, which was abandoned upon the filing hereof. BACKGROUND OF THE INVENTION (a) Field of the invention The present invention relates to a microscope apparatus for examining a wafer.

(b) Description of the prior art

As the prior art microscope apparatus for examining a wafer, there is, for example, such one as shown in FIG. 1, which is constructed basically of a sender 1; a wafer transportation unit 2; a turn table 3 and a noncontacting prealignment sensor 4 both of which are provided in the central region of the wafer transportation unit 2; an arm 5; an examination unit 6 provided separately by the side of said wafer transportation unit 2; an XY stage 7 provided in the central region of the examination unit 6; a microscopic objective 8 fixedly disposed above the XY stage 7; a receiver 9; and motor-driven transportation belts 10 provided for the sender 1, the wafer transportation unit 2 and the receiver 9, respectively, and which is designed to be operative in such a way that a wafer 12 loaded on a wafer cassette 11 which is placed on the sender 1 is fed onto the surface of the turn table 3 by the conveyor belt 10, and then the turn table 3 is rotated to thereby detect an orientation flat 12a of the wafer 12 by the non-contacting prealignment sensor 4 to determine the position thereof, and then the wafer 12 is transferred onto the XY stage 7 by the arm 5, and thereafter, while moving the wafer 12 in XY directions by means of the XY stage 7, it is examined by the objective 8, thereafter transferring the wafer 12 onto the transportation unit 2 by the arm 5, and the wafer is fed back by the transportation belt 10 into the wafer cassette 13 which has been set on the receiver 9. It should be noted, however, that this prior art wafer-examining microscope apparatus contains the step of picking up a wafer 12 from on the turn table 3 of the transportation unit 2 and of reloading same onto the XY stage 7 of the examination unit 6 which is provided by the side of the turn table 3, and also the step which is the reverse of the step mentioned just above. Thus, the distance of the movement of the wafer 12 tends to be long, giving rise to the problem that the time required for the examination tends to be long, accordingly. Also, this prior art microscope apparatus requires a specific mechanism, such as the arm 5, intended to pick up the wafer from the transportation unit 2, to load it onto the examination unit 6 nand to reload same from the examination unit 6 back onto the transportation unit 2, so that there has been the problem that the structure of the microscope apparatus becomes complicated. Also, because the examination unit 6 is separately provided by the side of the transportation unit 2, the apparatus has tended to require a large area for its installation, giving rise to the problem that the microscope apparatus per se tends to have a large size.

SUMMARY OF THE INVENTION

It is, therefore, a primary object of the present invention to provide a microscope apparatus for examining a wafer, which substantially reduces the steps and the time of examination, and simplifies the structure, and which, thus, allows the apparatus as a whole to have a very compact size.

According to the present invention, this object is attained by the provision of a wafer transportation unit, a wafer examination unit provided within said wafer transportation unit for being able to move the wafer independently of the direction of its transportation, and an objective optical system provided above said wafer examination unit for moving along the upper face of the wafer in a direction different from that of the transportation , whereby, it becomes possible to conduct an examination of the wafer while it is being transported. Thus, not only the time required for the examination of one wafer can be reduced substantially, but also the examination of a large-size wafer becomes easy. Because the wafer examination unit is incorporated within the wafer transportation unit, the wafer-shifting mechanism comprising, for example, an arm, becomes unnecessary, and for this reason, not only the apparatus as a whole becomes compact in size, but also the floor area necessary for the installation of the apparatus can be reduced also.

Another object of the present invention, is to provide a microscope apparatus for examining a wafer, which is arranged so that, even in case the observation optical system of the microscope is of the afocal type, when the objective optical system is to be moved above the surface of the wafer under examination, there can be used an image forming lens of a relatively small diameter, and that, in addition thereto, the amount of the shifting of the eye point position can be reduced substantially.

These and other objects of the present invention will become apparent during the course of the following detailed description and appended claims.

BRIEF DESCRIPTION OF THE DRAWINGS

Like parts are assigned with like reference numerals throughout the drawings for the sake of simplicity.

DETAILED DESCRIPTION OF THE PREFERRED EMBODIMENTS

Figure 1:
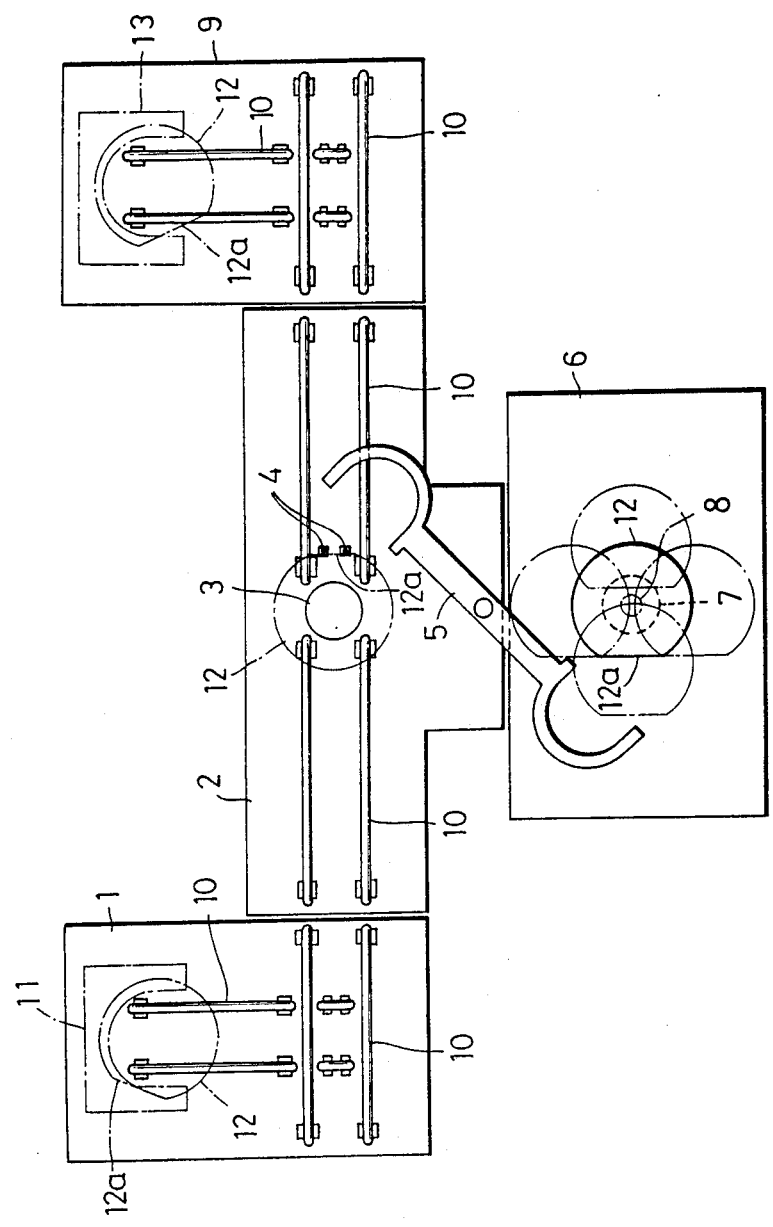
FIG. 1 is a diagrammatic plan view showing an example of the conventional apparatus for examiniing a wafer.
Figure 2:
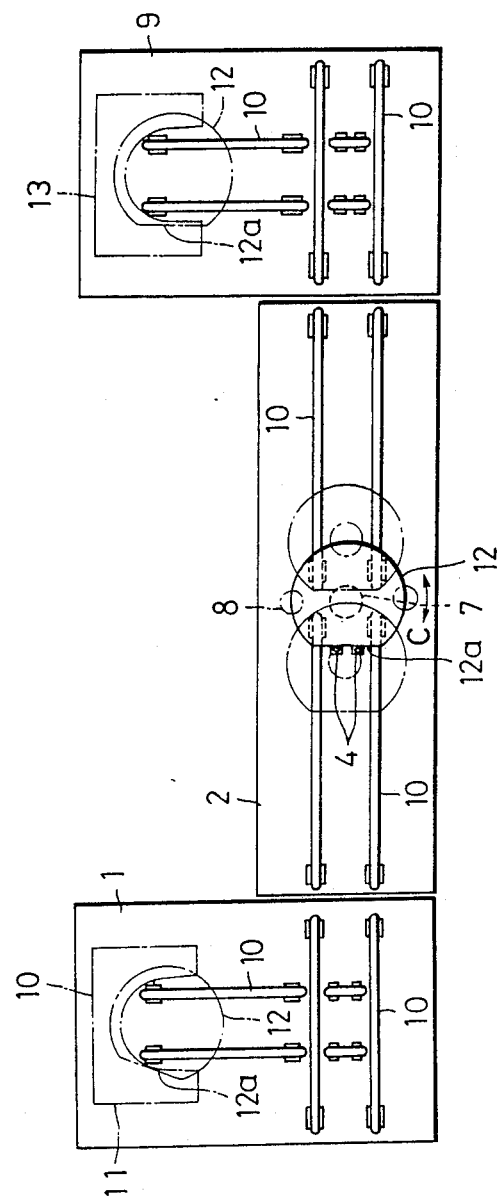
FIGS. 2 to 4 are a diagrammatic plan view, a diagrammatic perspective view and a diagrammatic side elevation, respectively, showing an embodiment of the microscope apparatus for examining a wafer according to the present invention.
Figure 3:
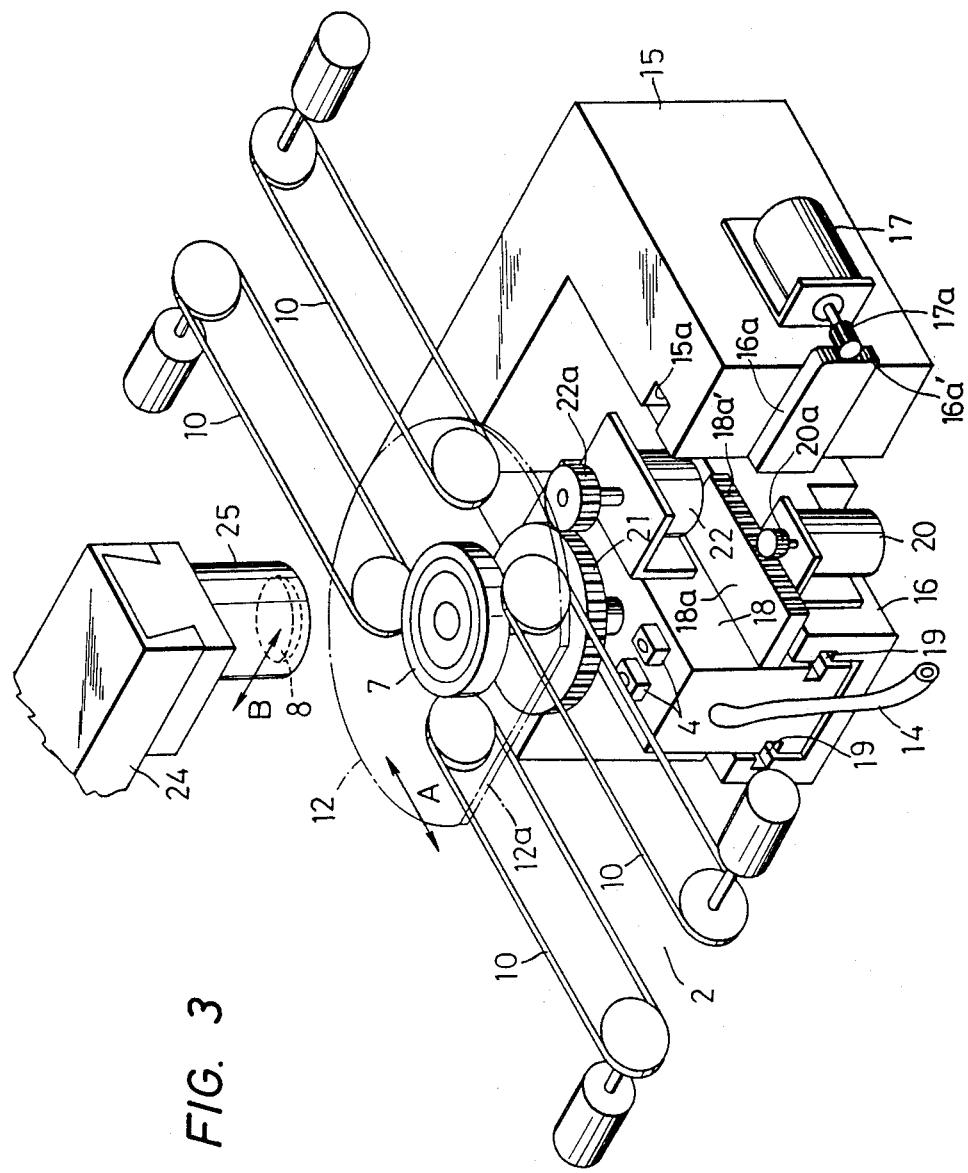
Figure 4:
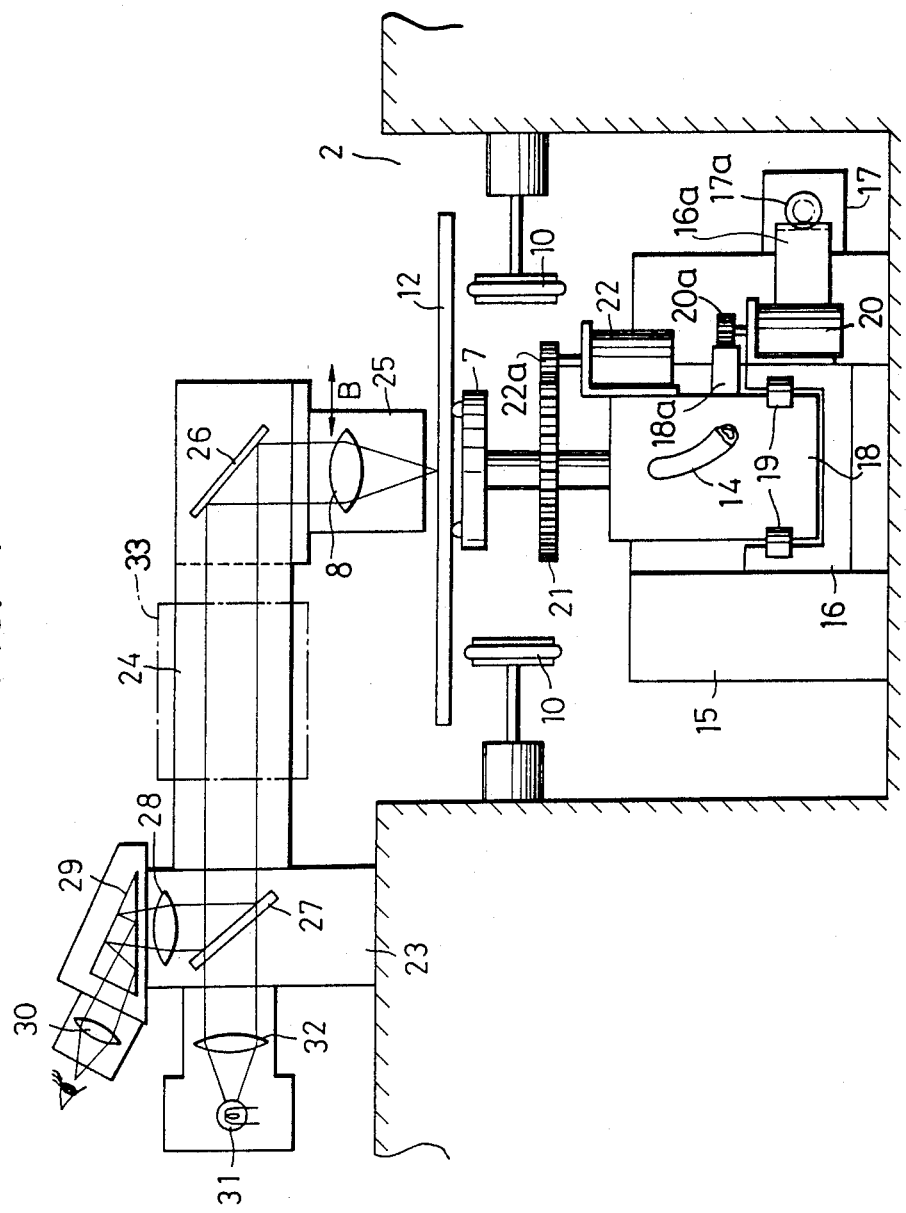

The present invention will hereunder be described in detail based on an embodiment shown in FIGS. 2 to 4. An examination stage 7 is incorporated within a wafer transportation unit 2, and it is connected to a vacuum pump not shown for communication therewith via a suction pipe 14 for holding, by virtue of suction, a wafer 12 on the upper face of the stage 7 on which the wafer is placed. Also, the examination stage 7 is arranged so that it is moved in a same direction as that of the transportation of the wafer 12 (the direction of an arrow A shown in FIG. 3) as well as in the vertical direction by a stage driving means which will be described later, and that furthermore it can be rotated in a horizontal plane. Reference numeral 15 represents a first frame provided in the wafer transportation unit 2; 16 a second frame mounted on said first frame 15 via a roller guide 15a for vertical shifting and driven by a motor 17 via a rack member 16a which extends from the first frame 15 and has a rack portion 16a' and also via a pinion 17a meshing with said rack portion 16a'; 18 a third frame mounted via a roller guide 19 on said second frame 16 for movement in a direction of the arrow A in FIG. 3 and driven by a motor 20 via a rack member 18a which extends from the second frame 16 and has a rack portion 18a' and also via a pinion 20a meshing with this rack portion 18a', and having the examination stage 7 rotatably secured to the upper portion thereof; 21 a gear secured to the rotary shaft of the examination stage 7 for rotating the examination stage 7 in a horizontal plane as the gear 21 is turned by a motor 22 via a pinion 22a which is meshed with said gear 21. These respective parts jointly constitute the aforesaid stage driving means. Numeral 23 represents an examination microscope body disposed at a position close to the wafer transportation unit 2 provided on the frame of the apparatus; 24 an observation tube fixed to the body 23; 25 an objective tube mounted on said observation tube 24 by dovetail-dovetail groove connection for movement in a direction normal to the direction of transportation of the wafer 12 (the direction of an arrow B in FIGS. 3 and 4) and housing therein an objective 8 and a mirror 26; 28 an image-forming lens provided within the body 23; 29 a prism provided on the body 23; 30 an ocular; 31 a light supply; and 32 a condenser lens. Here, an observation optical system which is comprised of the objective 8, the mirror 26, the half mirror 27, the image forming lens 28, the prism 29 and the ocular 30 is to be assumed to have, for example, an afocal arrangement which is such that, even when the optical path between the mirror 26 and the half mirror 27 is altered, the position to be focused does not change.

The microscope apparatus for examining a wafer according to the present invention is of the abovementioned arrangement. Therefore, when the apparatus is placed in an operating state, a wafer 12 contained in the wafer cassette 11 loaded on the sender 1 is fed onto the upper surface of the examination stage 7 by the transportation belt 10, and it is held on the examination stage 7 by virtue of suction produced by vacuum communicated to the stage 7 by means of the suction pipe 14. Then, the motor 17 is driven to lift the wafer examination stage 7 up to a position wherein it is in focus in relation to perception at the ocular 30 of the microscope (8 and 24-33). Next, the motor 22 is driven to rotate the examinatin stage 7 to thereby detect the orientation flat 12a of the wafer 12 by the noncontacting prealignment sensor 4 to determine its positioning, thereafter driving the motor 20 to move the examination stage 7 in the direction of the wafer transportation (the direction of an arrow A in FIG. 3) for the purpose of conducting an examination. The distance of the movement of the examination stage 7 at such a time need only to be a length corresponding to the diameter of the wafer 12. And, in addition thereto, the objective 8 is moved, either manually or by an electric driving operation, in a direction normal to the direction of the wafer transportation (the direction of an arrow B in FIG. 3), along the upper face of the wafer 12, it is possible to perform the examination of the entire surface of the wafer 12.

It should be noted here that, in case the wafer 12 is moved on the examination stage 7 in the direction indicated by the arrow A in FIG. 3 as the wafer 12 is being held on the transportation belt 10 and if, in this case, the objective 8 of the automatic focus-adjusting system is used, it is possible to keep the focused state even in case the transportation belt 10 has an uneven surface condition, so that it is also possible to omit the examination stage 7.

Figure 8:
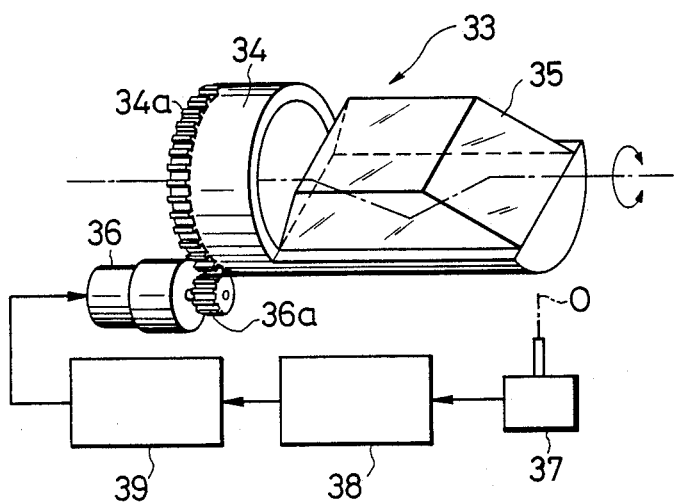
FIG. 8 is a diagrammatic perspective view showing an example of the image rotator means which is to be incorporated in the microscope apparatus for examining a wafer according to the present invention.

It should be noted here also that, in the abovedescribed embodiment, after the positioning of the wafer 12 has been determined on the examination stage 7, the motor 22 may be again operated for the purpose of examination, to rotate the examination stage 7 again, as shown by an arrow C in FIG. 2, thereby moving the objective 8 in the direction of the arrow B as stated above, whereby it is also possible to perform the examination of the entire surface of the wafer 12. In such an instance, there is the advantage such that the distance of the movement of the objective 8, i.e. the amount of variation of the optical path of the observation optical system, corresponds to the length of the radius of the wafer 12. However, because the image of the wafer 12 rotates in accordance with the rotation of the latter, there is a need to prevent rotation of the image by incorporating an image rotator means 33 midway of the observation optical system, e.g. within the observation tube 24 as shown by the chain line in FIG. 4. FIG. 8 shows an example of an image rotator means 33 which can be utilized suitably for this purpose. That is, in FIG. 8, reference numeral 34 represents a movable frame mounted rotatably about the optical axis within the observation tube 24 and having a gear formed on the circumference at one end and being locally formed in a cylindrical shape; and image rotator prism 35 secured on the movable frame 34 in such a manner that its principal axis coincides with the optical axis; 36 a step motor attached to, for example, the observation tube 24 and having pinion 36a secured to the output shaft thereof so as to mesh with the gear 34a; 37 a rotary encoder directly connected to either the rotation shaft of the motor 22 or the rotation shaft of the examination stage 7; 38 a circuit connected to the output terminal of the rotary encoder 37 for detecting the rotation angle of the examination stage 7 by the output signal delivered from the rotary encoder 37; and 39 a rotation angle converting circuit connected to the output terminal of the circuit 38 for controlling the rotation of the step motor 36 so as to rotate the image rotator prism 35 in such a way as to cancel, based on the output signal delivered from the circuit 38, the rotation of the image caused by the rotation of the wafer 12. This image rotator means 33 is mentioned here as a mere example, and those having various other arrangements may be used also. However, each of such various arrangements is well known, so that the explanation of its details is omitted here.

Figure 5:
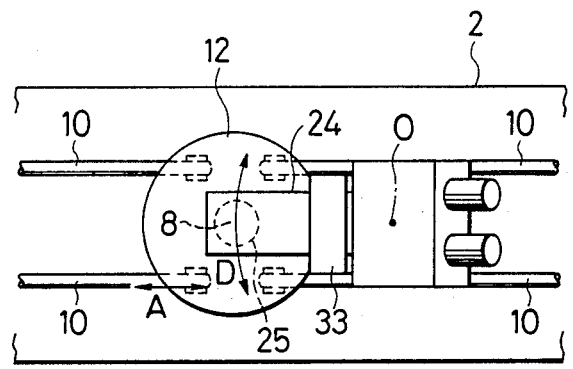
FIGS. 5 and 6 are a diagrammatic plan view of the essential portion and a diagrammatic side elevation showing another embodiment of the microscope apparatus for examining a wafer according to the present invention.
Figure 6:
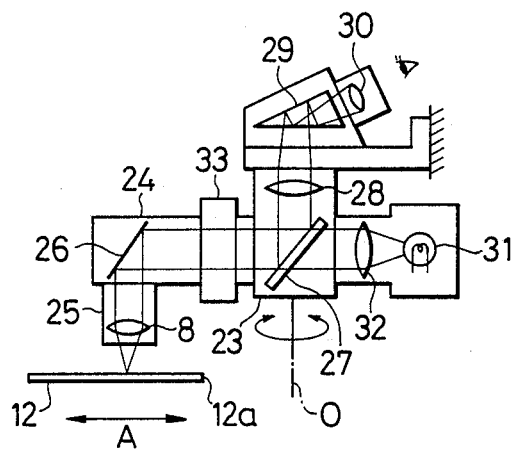

FIGS. 5 and 6 show another embodiment of the present invention. This instant embodiment is constructed in such a way that the ocular unit of the microscope is fixed to the base frame of the apparatus, and the other parts, i.e. the light supply unit 31, the condenser 32 and the observation tube 24, are arranged so as to be rotatable within a horizontal plane about a rotational axis which is the axis 0 coinciding with the optical axis of the image-forming lens 28, to thereby allow the objective 8 to move in the direction of the arc (in the direction of the arrow D in FIG. 5) intersecting the direction of transportation. In this case, the optical path between the mirror 26 and the half mirror 27 need not be altered, so that there is the advantage that the designing of the optical system of the microscope is facilitated. It should be noted here, however, that in this case also, the image rotates in accordance with the turning of the observation tube 24, i.e. the objective 8, so that there is the need to use such an image rotator means 33 as described above. In this instance, in case the image rotator means 33 as shown in FIG. 8 is employed, it is only necessary to connect the rotary encoder 37 directly to the rotation axis 0.

Figure 7:
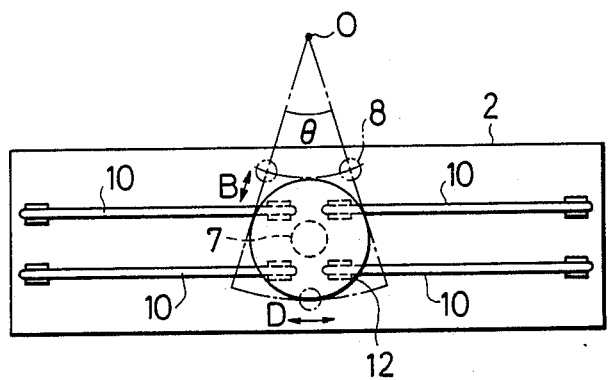
FIG. 7 is a diagrammatic explanatory illustration showing still another embodiment of the microscope apparatus for examining a wafer according to the present invention.

FIG. 7 shows still another embodiment of the present invention. In this instant embodiment, the objective 8 is arranged to be moved one-dimentionally in a direction, indicated by the arrow B, crossing the direction of transportation of the wafer 12 and to be allowed to rotate about the rotational axis 0 only for an angle $\theta$ which corresponds to the diameter of the wafer 12 in a manner similar to that shown in FIGS. 5 and 6. In this case, the examination stage 7, and accordingly the wafer 12, are observed while they are maintained in a stationary state.

What is claimed is:

1. A wafer examining apparatus, comprising:
   a wafer transporting means which is elongated in a length direction to provide a transportation path, and includes a conveying means which extends along said path, said transportation path having one site at which a wafer to be examined is accepted by said conveying means for transportation along said path, and another site, displaced from said one site along said path, at which a wafer, after having been examined, is off-loaded from said conveying means;
   means providing a wafer examining site vertically superimposed upon said path intermediate said one and other sites without lateral deviation therefrom, so that a wafer being conveyed from said one site to said other site may be examined at said examining site without any lateral excursion to reach and to return from said wafer examining site;
   a microscope for examining a wafer at said wafer examining site, said microscope having an image-providing system including ocular means at which an image of an area at a plane, measuring less in both length and width than a diameter of a wafer is presented, in use, and an objective through which said image is acquired by focusing upon said area, and means supporting said objective so that said objective is vertically superimposed upon said path at said wafer examining site; and
   at least one of said wafer transporting means and said microscope including means providing for relative movement between a wafer at said wafer examining site and said objective, parallel to said plane, along two intersecting paths which are sufficiently extensive as to permit all of said wafer at said level to be selectively brought within said area without necessitating shifting said wafer parallel to said plane by an amount greater than the diameter of the wafer.

2. The wafer examining apparatus of claim 1, wherein:
   for providing said relative movement along one of said two intersecting paths, said wafer transporting means includes a stage for temporarily raising a wafer from said conveying means, to said level, at said wafer examining site and means for moving said stage parallel to said plane and parallel to said transportation path; and
   for providing said relative movement along the other of said two intersecting paths, said microscope includes means for moving said objective parallel to said plane and crosswise of said transportation path.

3. The wafer examining apparatus of claim 1, wherein:
   for providing said relative movement along one of said two intersecting paths, said wafer transporting means includes means for reversingly moving said conveying means along said transportation path; and
   for providing said relative movement along the other of said two intersecting paths, said microscope includes means for moving said objective parallel to said plane and crosswise of said transportation path.

4. The wafer examining apparatus of claim 1, wherein:
   for providing said relative movement along one of said two intersecting paths, said wafer transporting means includes a stage for temporarily raising a wafer from said conveying means, to said level, at said wafer examining site and means for rotatingly moving said stage parallel to said plane about a vertical axis which intersects the wafer being examined at said wafer examining site; and
   for providing said relative movement along the other of said two intersecting paths, said microscope includes means for moving said objective parallel to said plane and crosswise of said transportation path.

5. The wafer examining apparatus of claim 4, wherein:
   said image-providing system of said microscope further includes an image rotator means operatively associated therewith for negating rotation of images of said area during said relative movement.

6. The wafer examining apparatus of claim 1, wherein:
   for providing said relative movement along one of said two intersecting paths, said wafer transporting means includes a stage for temporarily raising a wafer from said conveying means, to said level, at said wafer examining site and means for moving said stage parallel to said plane and parallel to said transportation path; and
   for providing said relative movement along the other of said two intersecting paths, said microscope includes means for rotatingly moving said objective parallel to said plane about a vertical axis which does not intersect the wafer being examined at said wafer examining site.

7. The wafer examining apparatus of claim 6, wherein:
   said image-providing system of said microscope further includes an image rotator means operatively associated therewith for negating rotation of images of said area during said relative movement.

8. The wafer examining apparatus of claim 1, wherein:
   for providing said relative movement along one of said two intersecting paths, said wafer transporting means includes means for reversingly moving said conveying means along said transportation path; and for providing said relative movement along the other of said two intersecting paths, said microscope includes means for rotatingly moving said objective parallel to said plane about a vertical axis which does not intersect the wafer being examined at said wafer examining site.

9. The wafer examining apparatus of claim 8, wherein:

said image-providing system of said microscope further includes an image rotator means operatively associated therewith for negating rotation of images of said area during said relative movement.

10. The wafer examining apparatus of claim 1, wherein:

for providing said relative movement along one of said two intersecting paths, said microscope includes means for moving said objective parallel to said plane and crosswise of said transportation path; and for providing said relative movement along the other of said two intersecting paths, said microscope includes means for rotatingly moving said objective parallel to said plane about a vertical axis which does not intersect the wafer being examined at said wafer examining site.

11. The wafer examining apparatus of claim 10, wherein:

said image-providing system of said microscope further includes an image rotator means operatively associated therewith for negating rotation of images of said area during said relative movement.

12. A method for examining a wafer, comprising:

conveying a wafer along a transportation path extending in a direction, from one site at which the wafer to be examined is accepted to be conveyed, and another site, displaced from said one site along said path, at which the wafer, after having been examined, is off-loaded;

providing a wafer examining site vertically superimposed upon said path intermediate said one and other sites and disposing at said wafer examining site a microscope having a image-providing system including an ocular at which an image of an area at a plane, measuring less in both length and width than a diameter of the wafer is presented, in use, and an objective through which said image is acquired by focusing upon said area;

temporarily interrupting conveying of said wafer along said transportation path, thereby to dispose said wafer at said wafer examining site, and examining said wafer through said microscope while moving at least one of said wafer and said objective parallel to said plane along two intersecting paths which are sufficiently extensive as to permit all of said wafer at said level to be selectively brought within said area without necessitating shifting said wafer parallel to said plane by an amount greater than the diameter of the wafer.

* * * * *